United States Patent [19]

Clark

[11] Patent Number: 5,492,959

[45] Date of Patent: Feb. 20, 1996

[54] BLENDS OF POLYESTERS AND ALKYLHYDROXY (METH)ACRYLATE COMPOUNDS

[76] Inventor: Mark D. Clark, 3540 McIntosh Dr., Kingsport, Tenn. 37663

[21] Appl. No.: 286,834

[22] Filed: Aug. 5, 1994

Related U.S. Application Data

[62] Division of Ser. No. 909,375, Jul. 6, 1992, Pat. No. 5,342,877.

[51] Int. Cl.[6] ............................... C08J 3/02; C08K 3/20
[52] U.S. Cl. ..................... 524/457; 524/388; 524/513
[58] Field of Search ..................... 524/457, 388, 524/513

[56] References Cited

U.S. PATENT DOCUMENTS

| | | | |
|---|---|---|---|
| 3,734,874 | 5/1973 | Kibler et al. | 260/29.2 |
| 3,779,993 | 12/1973 | Kibler et al. | 260/75 |
| 4,090,991 | 5/1978 | Fukusaki et al. | 260/23 |
| 4,233,196 | 11/1980 | Sublett | 260/29.2 |
| 4,880,700 | 11/1989 | Charmot et al. | 428/337 |
| 4,925,588 | 5/1990 | Berrod et al. | 252/174.23 |
| 4,939,233 | 7/1990 | Jenkins et al. | 528/272 |
| 4,946,932 | 8/1990 | Jenkins | 528/272 |
| 4,954,558 | 9/1990 | Tsaur | 525/460 |
| 5,011,883 | 4/1991 | Aksman | 524/513 |

FOREIGN PATENT DOCUMENTS

| | | |
|---|---|---|
| 333547 | 3/1989 | European Pat. Off. . |
| 400410 | 5/1990 | European Pat. Off. . |
| 2-58285 | 12/1990 | Japan . |
| 146549 | 6/1991 | Japan . |
| WO91/08237 | 8/1991 | WIPO . |

OTHER PUBLICATIONS

F. Cuirassier et al., Paper presented at Aug., 1987 National ACS Meeting Entitled "Preparation of Microlatex in the Presence of Functionalized Polyesters as Surfactants".

Primary Examiner—Judy M. Reddick
Attorney, Agent, or Firm—Betty J. Boshears; Harry J. Gwinnell

[57] ABSTRACT

An aqueous dispersion comprising a polyester having repeat units from at least one difunctional sulfomonomer containing at least one metal sulfonate group attached to an aromatic nucleus wherein the functional groups are carboxyl or hydroxyl, and a polymer having repeat units from styrene or one or more derivatives of styrene, hydroxyalkyl (meth-)acrylate, wherein this polymer is formed from monomers polymerized in an aqueous dispersion of said polyesters.

7 Claims, No Drawings

BLENDS OF POLYESTERS AND ALKYLHYDROXY (METH)ACRYLATE COMPOUNDS

This is a divisional application of application Ser. No. 07/909,375, filed on Jul. 6, 1992 and now U.S. Pat. No. 5,342,877.

FIELD OF THE INVENTION

This invention relates to blends of water-dispersible polyesters or polyamides with styrene/hydroxyethyl acrylate or styrene/hydroxyethyl methacrylate copolymer.

BACKGROUND OF THE INVENTION

Many water-based polymer systems for water-based inks and overprint varnishes are readily coatable onto paper, plastic or metal substrates.

Such polymeric systems are disclosed in the following patents:

U.S. Pat. No. 4,946,932 assigned to Eastman Kodak Company discloses water-dispersible polyester and polyesteramide blends with certain vinyl polymers. The products are obtained via semi-batch emulsion polymerization of one or more vinyl monomers in the presence of an aqueous dispersion of a preformed water-dispersible polyester or polyesteramide. The product is a milky latex dispersion having particle sizes in the range of about 150 nm to about 500 nm.

U.S. Pat. No. 4,939,233 assigned to Eastman Kodak Company discloses an aqueous dispersion comprising a water-dispersible polyester or polyesteramide and a vinyl polymer having a majority of repeat units from vinyl acetate wherein the latex polymer is formed via emulsion polymerization of the vinyl monomer in the presence of an aqueous dispersion of the polyester or polyesteramide. However, some of these polymeric materials retain an undesirable water sensitivity when the coatings are dried. This water sensitivity can result in blocking or transfer of color if the wet surface comes in contact with another substrate. Such sensitivity can also result in total removal of the ink film from nonporous substrates such as plastic film or metal foil. Thus, it is desirable to have water-dispersible polymeric compositions which exhibit excellent dry- and wet-block resistance in overprint varnish applications and/or excellent water-resistance, adhesion and printability in ink applications.

SUMMARY OF THE INVENTION

According to the present invention, there is provided aqueous polymer dispersions comprising:

(a) a polyester (A) consisting essentially of repeat units from about 5 to about 40% by weight of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester forming or esteramide forming derivatives thereof:

(1) at least one difunctional aromatic, saturated aliphatic or saturated alicyclic dicarboxylic acid;

(2) from about 4 to about 25 mole percent, based on a total of all acid and hydroxyl equivalents being equal to 200 mole percent, of at least one difunctional sulfomonomer containing at least one metal sulfonate group attached to aromatic nucleus wherein the functional groups are hydroxy or carboxyl;

(3) at least one difunctional reactant selected from a glycol or a mixture of a glycol and diamine having two —NRH groups, the glycol containing two

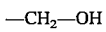
—CH$_2$—OH groups; and (4) from none to at least one difunctional reactant selected from a hydroxy-carboxylic acid having one —CR$_2$—OH, an aminocarboxylic acid having one —NRH group, an amino-alcohol having one

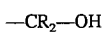
—CR$_2$—OH group and one —NRH or mixtures thereof, wherein each R is an H atom or an alkyl group of 1 to 4 carbon atoms; and (b) 95 to 60% by weight of a polymer (B) having repeat units from (1) about 20 to about 80% by weight of a polymer comprising repeat units from styrene or one or more derivatives of styrene;

(2) about 15 to about 50% by weight of hydroxyalkyl (meth)acrylate, with the proviso that said hydroxyalkyl methacrylate is not hydroxypropyl methacrylate; and (3) about 0 to about 60% by weight of alkyl (meth)acrylate, said aqueous dispersion containing about 95–60% of said polymer (B) and about 5–40% of said polyester (A), both said percentages being based on the combined weight of (A) and (B).

The invention also includes a method of preparing an aqueous polymer dispersion which comprises:

(I) forming an aqueous dispersion having the components of Polyester (A) and Polymer (B) as described above, and (II) polymerizing said component b(1), b(2) and b(3) of polymer (B) monomers in said aqueous dispersion, to thereby obtain an aqueous dispersion of a blend of polymers with a total solids content of up to about 60%.

The advantages of this invention include excellent dry- and wet- block resistance in overprint-varnish applications and/or excellent water-resistance, adhesion and printability in ink applications.

DETAILED DESCRIPTION OF THE PREFERRED EMBODIMENTS

The present invention provides high solids aqueous polymer compositions, sometimes referred to herein as "blends" comprising polyester (A) and polymer (B).

Polyester (A) consists essentially of repeat units from:

(a) about 5 to about 40% by weight of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/ tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (1), (2), (3) and (4) from the following components or ester forming or esteramide forming derivatives thereof:

(1) at least one difunctional aromatic, saturated aliphatic or saturated alicyclic dicarboxylic acid;

(2) from about 4 to about 25 mole percent, based on a total of all acid and hydroxyl equivalents being equal to 200 mole percent, of at least one difunctional sulfomonomer containing at least one metal sulfonate group attached to aromatic nucleus wherein the functional groups are hydroxy or carboxyl;

(3) at least one difunctional reactant selected from a glycol or a mixture of a glycol and diamine having two —NRH groups, the glycol containing two

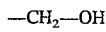
—CH$_2$—OH groups; and (4) from none to at least one difunctional reactant selected from a hydroxy-carboxylic acid having one —CR$_2$—OH, an aminocarboxylic acid having one —NRH group, an amino-alcohol having one

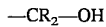
—CR$_2$—OH group and one —NRH or mixtures thereof, wherein each R is an H atom or an alkyl group of 1 to 4 carbon atoms.

Preferably, the glycol of Polyester (A) of (3) above contains some poly(ethylene glycol) to aid in its water dispersibility. When some poly(ethylene glycol) is used, the content of the sulfomonomer can be lower, which aids in flexibility of formulating the polyester.

The water dispersibility of the polyester is; related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

It has been found that the respective concentrations of the polymeric components may be broadly about 95–60% by weight of polymer (B) and about 5–40% by weight of polyester (A), both said percentages being based on the combined weight of (A) and (B). However, the preferred concentrations are 90–75% polymer (B) and 10–25% polyester (A).

Polymer (B) consists essentially of about 95 to 60% by weight of a polymer having repeat units from (1) about 20 to about 80% by weight of a polymer comprising repeat units from styrene or one or more derivatives of styrene;

(2) about 15 to about 50% by weight of hydroxyalkyl (meth)acrylate, with the proviso that said hydroxyalkyl methacrylate is not hydroxypropyl methacrylate; and (3) about 0 to about 60% by weight of alkyl (meth)acrylate.

The aqueous dispersion contains from about 95–60% by weight of polymer (B) and about 5–40% by weight of polyester (A), both said percentages being based on the combined weight of (A) and (B).

In the preferred form of the present invention, the polyester contains repeating units of a poly(ethylene glycol) of the formula H—(OCH$_2$—CH$_2$)$_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax" a product of Union Carbide. Diethylene glycol is also especially suitable.

Other useful glycols for preparing copolyester may consist of aliphatic, alicyclic and aralkyl glycols. Examples of these glycols include ethylene glycol; propylene glycol; 1,3-propanediol; 2,4-dimethyl-2-ethylhexane 1,3-diol; 2,2-dimethyl-1,3-propanediol; 2-ethyl-2-butyl-1,3-propanediol; 2-ethyl-2-isobutyl-1,3propanediol; 1,3-butanediol, 1,4-butanediol, 1,5-pentanediol, 1,6-hexanediol, 2,2,4-trimethyl-1, 6-hexanediol; thiodiethanol. 1,2-cyclohexanedimethanol, 1,3-cyclohexandimethanol; 1,4-cyclohexandeimethanol; 2,2,4,4-tetramethyl-1,3-cyclobutanediol; and p-xylylenediol.

The dicarboxylic acid component of the polyester are selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic and isophthalic acid. Terephthalic acid and isophthalic acid are preferred as the carboxylic acid component of the polyester.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and latex by ion-exchange replace this ion with a different ion, and thus alter the characteristics of the polymer. The difunctional monomer component may also be referred to the difunctional sulfomonomer and is further described hereinbelow.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

It is preferred that the polyester have repeat units from isophthalic acid, sodiosulfoisophthalic acid, diethylene glycol, and another glycol selected from at least one of ethylene glycol and 1,4-cyclohexanedimethanol, and another polymer containing at least 20% by weight of repeat units from styrene or one or more derivatives of styrene, and 15% by weight of hydroxyalkyl (meth)acrylate, with the proviso that said hydroxyalkyl methacrylate is not hydroxypropyl methacrylate.

If desired, the styrene or styrene derivative(s) and the hydroxyalkyl (meth)acrylate of Polymer B, as described herein, may be mixed with additional monomers which are copolymerizable with the styrene or styrene derivatives, hydroxyalkyl (meth)acrylate. The comonomers may be present in amounts from 0 to about 60 weight percent. Polymer blends in which polymer (B) contains from about 35 to about 100% of a combination of the weight percents of styrene or styrene derivatives and hydroxyalkyl (meth)acrylate as described herein are preferred. The preferred total amount of comonomers is approximately about 0–40 weight percent.

One class of suitable comonomers are acrylic and methacrylic esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters.

The acrylic and methacrylic acid esters may contain additional functional groups of the alcohol moiety, such as for example, hydroxyl, amine, halogen, ester, carboxylic acid, amide, nitrile and alkyl groups. Functionalized monomers such as blocked isocyanate acrylates and methacrylates may also be used to provide crosslinking sites for the preparation of curable systems.

Also, particularly useful as comonomers are lower alkyl diesters of unsaturated dicarboxylic acids. For example, $C_{1-4}$ diesters of maleic and fumaric acids, e.g., dibutyl maleate, may be used in copolymers with styrene or styrene derivatives and hydroxyalkyl (meth)acrylate or hydroxyalkylacrylate as described herein.

Other useful comonomers include acrylonitrile, acrylic acid, maleic anhydride, fumaric acid, methacrylic acid, acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester blend.

It is preferred that polymer (B) comprise repeat units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl-chloride and maleic anhydride.

It is more preferred that polymer B comprise repeat units from at least 20% by weight of one or more comonomers selected from styrene, methylmethacrylate, ethylhexylacrylate and butylacrylate.

The compositions of the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer in the dispersion prior to polymerization will vary widely and depends on the intended application.

The polymerization can be initiated by a water-soluble or water-dispersible free radical initiator known in the art such as sodium persulfate, or by an oil-soluble initiator such as benzoyl peroxide. Other useful initiators include redox initiators such as sodium persulfate, ammonium persulfate, sodium metabisulfite, and sodium formaldehyde sulfoxylate/Fe/hydrogen peroxide. The concentration of the initiator will generally range from about 0.01% to about 0.5% based on total reaction weight.

The sulfonate-group containing polyesters which are used in the present invention typically become very viscous at concentrations above the 30 percent total solids. Thus, the reaction typically is begun with a polyester dispersion that is about 30 percent total solids or less. However, the water-dispersible polyester blend dispersions which are prepared by the process of the present invention can be prepared at final total solids levels up to about 45 percent to 65 percent. A total solids content of about 25 percent to 45 percent is preferred. The increase in solids level is achieved during polymerization by controlling the amount of water, if any, which is added along with the monomer. By decreasing the amount of water added during the polymerization, increased total solids contents up to about 50 percent to 65 percent are possible. This increase in solids level offers significant benefits for the use of the water-dispersible polyesters of the present invention.

The copolymerization of the styrene and acrylate monomer(s) in the presence of water-dispersible polyester may be conducted batchwise, semi-batch or in a continuous manner.

In a preferred embodiment, the sulfonate group-containing polyester is prepared, generally by melt phase polymerization techniques which are well known in the art. The polymers as prepared may be directly dispersed in hot water or extended into rods and chopped into pellets. These pellets can later be dispersed in hot water if desired. An aqueous dispersion containing about 5–35 weight %, preferably from about 10 percent to 30 percent total solids, is prepared from the polyester directly. A mixture of one or more monomers and the polymerization initiators may then be added to the aqueous dispersion of the polyester and polymerization initiated to produce an aqueous dispersion. When using a persulfate initiator, for example, the polymerizations are generally conducted at temperatures of about 70° C. to about 90° C. Usually a small amount of initiator is added toward the end of the copolymerization in order to react as much of the styrene and hydroxyethyl (meth)acrylate or hydroxypropylacrylate monomers as possible. It is desirable to have less than 100 ppm of unreacted vinyl/acrylic monomer(s) in the final product and preferably less than 50 ppm unreacted monomer(s). The aqueous dispersion so produced can be prepared with total solids contents from about 10 percent to about 65 percent.

In another mode of operation, some of the aqueous polyester dispersion is added to the reaction vessel while the vinyl monomers and initiator are dispersed in another portion of the polyester dispersion. After heating the reaction mixture to the desired temperature, the portion containing polyester, vinyl monomers and initiator is gradually added with stirring. The translucent latexes obtained have virtually no coagulum.

The aqueous dispersion of polymer prepared in this manner may be used directly as paper adhesives and coatings. Viscosity control agents, colorants, dyes, stabilizers, etc., may be added to the aqueous dispersions to prepare specific adhesives and coatings.

The total solids content of the aqueous dispersion is controlled by the relative amounts of polymers which are used in the polymerization reaction and by the amount of water added during polymerization. As noted above, dispersions of sulfonate group-containing polymers can practically be prepared only at total solids contents up to about 30 percent. Above 30 percent, these dispersions become highly viscous and difficult to process. Higher total solids contents can be obtained by increasing the amount of monomer and decreasing the amount of polyester which are used in the polymerization reaction.

It is preferred that the aqueous dispersion of the invention have a solid content of about 25 to about 45 weight %.

It is also preferred that polyester (A) (component (a)) have a solid content of from about 5 to about 40 weight %, preferably about 10 to about 30 weight %, based on dry solids.

The specific amounts of polyester (A) and polymer (B) can be chosen by one skilled in the art depending on the specific monomers, the desired total solids content and the application for which the aqueous dispersion is intended.

These blends can be formulated by those skilled in the art so that excellent wet block resistance in overprint varnish applications as well as excellent printability, adhesion, and water-resistance in ink applications for paper, film and foil results. However, these properties are dependent on latex composition, particularly on the composition of the styrene/(meth)acrylate co- or terpolymer. The particle size of these aqueous polymer blends generally range from ≦300 nm, and more preferably from about 40 nm to about 200 nm. It is believed that the hydroxyethyl (meth)acrylate or hydroxypropyl acrylate monomers are responsible for providing polymer blends with these small particle sizes. It is also believed that the hydroxyethyl (meth)acrylate or hydroxypropyl acrylate serves as a reactive cosolvent which lowers the interfacial tension between the monomer droplets and the aqueous phase, thereby lowering the monomer droplet size and consequently reducing the final particle size. The hydrophilic hydroxyethyl (meth)acrylate or hydroxypropyl acrylate may also react with the hydrophobic styrene and/or (meth)acrylate monomer units to form oligomeric surfactant molecules in situ. Such an interaction would allow a low emulsion particle size to be maintained even with a reduction in the amount of the water-dispersible polyester (i.e., primary surfactant) present in the latex. Finally, the presence of the hydroxyethyl (meth)acrylate or hydroxypropyl acrylate reduces the amount of coagulum formed during latex preparation.

The dispersions or blends according to this invention may be used by applying them as a coating to a substrate such as paper followed by drying to leave a residue of solids in the form of a coating. Alternately, a second substrate can be applied prior to drying to form a bond between the substrates.

The invention also includes a method of preparing an aqueous polymer dispersion which comprises forming an aqueous dispersion having the components of polyester (A) and polymer (B) as described herein and polymerizing components b(1), b(2) and b(3) of polymer B in the aqueous dispersion, to thereby obtain an aqueous dispersion of a blend of polymers with a total solids content of up to about 60%.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise noted. For the purposes of further describing the following examples, Table 1 gives a description of the components of the polyesters tested.

TABLE 1

| Polyester | TPA | IPA | SIP | EG | DEG | TEG | CHDM | NPG | I.V. | $T_g$ |
|---|---|---|---|---|---|---|---|---|---|---|
| A | — | 89 | 11 | — | 100 | — | 0 | — | 0.42 | 29 |
| B | — | 89 | 11 | — | 78 | — | 22 | — | 0.36 | 38 |
| C | — | 82 | 18 | — | 54 | — | 46 | — | 0.33 | 55 |
| D | — | 89 | 11 | 28 | 72 | — | — | — | 0.42 | 35 |
| E | 73 | 16 | 11 | 50 | 35 | 15 | — | — | 0.46 | 49 |
| F | 35 | 50 | 15 | 24 | 16 | 9 | — | 51 | 0.25 | 58 |

TPA = terephthalic acid
IPA = isophthalic acid?
SIP = 5-sodiosulfoisophthalic acid
EG = ethylene glycol
DEG = diethylene glycol
TEG = triethylene glycol
CHDM = 1,4-cyclohexanedimethanol
NPG = neopentyl glycol

EXAMPLE 1

Items A (water, initiator), B (monomers, C (water, polyester dispersion) and D (water, polyester dispersion, sodium carbonate) listed in Table 2 below were prepared by thoroughly mixing the components of each item. Items B and D were mixed together with vigorous agitation to yield in each case a milky white pre-emulsion. Emulsion Polymer 6 is an exception to this in that no pre-emulsion was prepared; i.e., a neat monomer mixture was added to the reactor. Item C and one-tenth (1/10) of Item A were added to a reactor and heated to 85° C. The pre-emulsion from Items B and D and the remainder of Item A were simultaneously added to the reactor over a period of 150 minutes and 180 minutes, respectively. The reaction mixture was cooked for 120 minutes at 85° C. after the addition of Item A was complete. The resulting latexes were cooled to room temperature and filtered through a 110 micron polyethylene mesh to remove coagulum. Latex particle size as well as the amount of coagulum formed in each reaction are presented in Table 2.

TABLE 3-continued

| Emulsion Polymer # | 60° Gloss (%) | Wet-Block Resistance |
|---|---|---|
| 2 | 42.1 | Poor |
| 3 | 15.9 | Excellent |
| 4 | 28.9 | Poor |
| 7 | 35.7 | Fair |

TABLE 2

| Emulsion Polymer | A | | B | | | | | C Polyester C Dispersion (@ | | D Polyester C Dispersion (@ | | | Particle Diameter | g coagulum |
|---|---|---|---|---|---|---|---|---|---|---|---|---|---|---|
| | $H_2O$ | APS | ST | HEMA | HEA | HPMA | HPA | $H_2O$ | 33% Solid | $H_2O$ | 33% Solid | $Na_2CO_3$ | (microns) | kg Latex |
| 1 | 113 | 0.8 | 180 | 90 | — | — | — | 126 | 36 | 180 | 54 | 0.7 | 0.064 | 0.37 |
| 2 | 113 | 0.8 | 180 | — | 90 | — | — | 126 | 36 | 180 | 54 | 0.7 | 0.070 | 1.47 |
| 3 | 113 | 0.8 | 180 | — | — | 90 | — | 126 | 36 | 180 | 54 | 0.7 | 0.158 | 31.60 |
| 4 | 113 | 0.8 | 180 | — | — | — | 90 | 126 | 36 | 180 | 54 | 0.7 | 0.083 | 0.93 |
| 5 | 113 | 0.8 | 150 | 90 | — | — | — | 43 | 127 | 173 | 54 | 0.7 | 0.042 | 0.17 |
| 6 | 113 | 0.8 | 180 | 90 | — | — | — | 276 | 90 | — | — | $0.7^1$ | 0.057 | 0.13 |
| 7 | 75 | 0.8 | 217 | — | — | — | — | 276 | 127 | 188 | 81 | $0.7^2$ | 0.104 | 127 |

*APS = Ammonium persulfate
ST = Styrene
HEMA = 2-Hydroxyethyl methacrylate
HEA = 2-Hydroxyethyl acrylate
HPMA = 2-Hydroxypropyl methacrylate
HPA = 2-Hydroxypropyl acrylate
[1]Added to initiator solution
[2]Added to pre-emulsion

EXAMPLE 2

Industry standard wet-block resistance tests generally involve placing an overprinted ink film face-to-face with itself and simultaneously subjecting it to water (either from the front or back of the film), pressure (0.5–1.5 psi), and elevated temperature (55°–70° C).

An overprint formulation containing 80.2 parts of the polymer latex, 6.9 parts of a polymeric film-forming additive, 2.7 parts surfactant, and 10,.2 parts of a 30% solids polyethylene wax dispersion was coated on printed paper stock using a K Control Coater equipped with an RK1 rod (R. K. Print-Coat Instruments, Ltd.). Samples were dried in a 100° C. forced-air oven for 3–5 seconds and overnight at room temperature. Gloss of the overprinted samples was measured at a 60° angle using a Lange Reflektometer. The overprinted ink films were then cut into 3"×6" strips and folded in half with the coating to the inside. A drop of water was placed on the back of the sample, and the samples were separated from one another by aluminum foil. These samples were then subjected to 1 psi at 60° C. for 16 hours, at which time the printed surfaces were peeled apart and the film/paper surface evaluated. The results of gloss measurements and the wet-block resistance test are presented in Table 3.

TABLE 3

| Emulsion Polymer # | 60° Gloss (%) | Wet-Block Resistance |
|---|---|---|
| 1 | 34.6 | Excellent |

EXAMPLE 3

A pre-emulsion was formed from 227 g demineralized water, 0.35 g sodium carbonate, 108 g Polyester C dispersion (33% solid) and the monomers as listed in Table 3 below. An initiator solution was prepared from 75 g of demineralized water and 0.8 g of ammonium persulfate. 57 g demineralized water, 27 g of Polyester C dispersion and one-tenth (1/10) of the initiator solution were added to a reactor and heated to 75° C. The pre-emulsion and remaining initiator solution were simultaneously added to the reactor over a period of 150 minutes and 180 minutes, respectively. The reaction mixture was cooked for 120 minutes at 85° C. after the addition of Item A was complete. The resulting latexes were cooled to room temperature and filtered through a 110 micron polyethylene mesh to remove coagulum. Latex particle size as well as the amount of coagulum formed in each reaction are presented in Table 4.

TABLE 4

| Emulsion Polymer | Monomers* (in grams) | | | | | | | Particle Diameter (microns) | g coagulum kg Latex |
|---|---|---|---|---|---|---|---|---|---|
| | ST | HEMA | HEA | HPMA | HPA | 2 EHA | BA | | |
| 8 | 120 | 60 | — | — | — | 75 | — | 0.049 | 0.05 |
| 9 | 120 | 60 | — | — | — | — | 75 | 0.056 | 0.20 |
| 10 | 120 | — | 60 | — | — | 75 | — | 0.066 | 7.50 |
| 11 | 120 | — | — | 60 | — | 75 | — | 0.152 | 52.90 |
| 12 | 120 | — | — | — | 60 | 75 | — | 0.224 | 0.23 |
| 13 | 195 | 60 | — | — | — | — | — | 0.056 | 0.28 |
| 14 | 180 | — | — | — | — | 75 | — | 0.184 | 0.83 |

*ST = Styrene
HEMA = 2-Hydroxyethyl methacrylate
HEA = 2-Hydroxyethyl acrylate
HPMA = 2-Hydroxypropyl methacrylate
HPA = 2-Hydroxypropyl acrylate
2 EHA = 2-Ethylhexyl acrylate
BA = Butyl acrylate

EXAMPLE 4

A pigmented ink formulation containing 70.0 parts of the polymer latex, 30 parts of a pigment millbase (35% pigment), 0.5 parts surfactant and 2.0 parts of a 30% solids polyethylene wax dispersion was coated on a corona-treated polyethylene film using a K Control Coater equipped with an RK1 rod (R. K. Print-Coat Instruments, Ltd.). Samples were dried in a 100° C. forced-air oven for 3 seconds and overnight at room temperature. Adhesion of the ink-to the substrate was measured by placing a piece of adhesive tape on the ink film and removing the tape. The degree to which the tape removes the ink film is an indicator of adhesion to the substrate. Water-resistance of the ink films was measured by placing a drop of water on the printed substrate for 1, 5 and 20 minutes. After the designated time had elapsed, the water drop was wiped off using a tissue and firm pressure. Adhesion and water-resistance data are presented in Table 5.

TABLE 5

| Example No. | Adhesion to Substrate | Water-Resistance | | |
|---|---|---|---|---|
| | | 1 Minute | 5 Minutes | 20 Minutes |
| 9 | Very Good | Excellent | Very Good | Very Good |
| 10 | Fair | Excellent | Good | Good |
| 11 | Very Good | Fair | Poor | Poor |
| 12 | Very Good | Excellent | Poor | Poor |
| 13 | Fair | Fair | Fair | Fair |
| 14 | Poor | Excellent | Excellent | Excellent |
| 15 | Fair | Excellent | Excellent | Excellent |

Similarly good results are achieved when a polyester-amide containing 82 mole % isophthalic acid, 18 mole % 5-sodiosulfoisophthalic acid, 55 mole % diethylene glycol, 40 mole % 1,4-cyclohexanedimethanol and 5 mole % 1,4-cyclohexanebismethylamine is used instead of Polyester C.

EXAMPLE 5

This example is intended to demonstrate the diversity of water-dispersible polyesters which can be used within the scope of this invention. A stable pre-emulsion was formed from 173 g of demineralized water, 0.70 g of sodium carbonate, 60 g of a 30.0% solids aqueous dispersion of a Polyester A as described in Table 1, 180 g of styrene and 90 g of 2-hydroxyethyl methacrylate (HEMA). An initiator solution was prepared from 113 g of demineralized water and 0.8 g of ammonium persulfate. A reactor was charged with 93 g of demineralized water, 36 g of the aqueous dispersion of Polyester A and 11.3 g of the initiator solution. The reactor was heated to 85° C. at which time the pre-emulsion was added to the reactor over a period of 2.5 hours while the remaining initiator solution was added over 3 hours. After addition of the initiator solution was complete, the reaction is cooked at 85° C. for two hours. The latex was cooled and filtered through a 110 micron polyethylene mesh. Using this procedure, similar latex materials were prepared using Polyesters B, D, E and F as described in Table 1. Physical characteristics of these latex materials are presented in Table 6.

TABLE 6

| Emulsion Polymer | Polyester (Table 1) | Particle Diameter (microns) | g coagulum kg latex |
|---|---|---|---|
| 15 | A | 0.149 | 7.69 |
| 16 | B | 0.088 | 0.15 |
| 17 | D | 0.084 | 0.97 |
| 18 | E | 0.079 | 0.32 |
| 19 | F | 0.061 | 0.05 |

Polyester E is Gerol 32 from Rhone Poulenc Chimie.
Polyester F is XWR-905 from Nippon Goshei.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. The method of preparing an aqueous polymer dispersion which comprises:

(I) forming an aqueous dispersion comprising
(a) a polyester (A) consisting essentially of about 5 to about 40% by weight of a linear, water-dissipatable polymer comprising carbonyloxy linking groups in the linear molecular structure wherein up to 80% of the linking groups are carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (1), (2), (3) and (4) from the following components or ester forming or esteramide forming derivatives thereof:
(1) at least one aromatic, saturated aliphatic or saturated alicyclic dicarboxylic acid;
(2) from about 4 to about 25 mole percent, based on a total of all acid and hydroxyl equivalents being equal to 200 mole percent, of at least one difunctional sulfomonomer containing at least one metal sulfonate group attached to an aromatic nucleus wherein the two functional groups of said difunctional sulfomonomer are selected from the group consisting of hydroxy and carboxyl;
(3) at least one difunctional reactant selected from the group consisting of a glycol or a mixture of a glycol and diamine having two —NRH groups, the glycol containing two —$CH_2$—OH groups; and
(4) from none to at least one reactant selected from the group consisting of a hydroxy-carboxylic acid having one —$CR_2$—OH group, an aminodicarboxylic acid having one —NRH group, an aminoalcohol having one $CR_2$—OH group and one —NRH group and mixtures of said reactants, wherein each R is an H atom or an alkyl group of 1 to 4 carbon atoms;

and (b) 95 to 60% by weight of a polymer (B) comprising repeat units from
(1) about 20 to about 80% by weight of styrene or one or more derivatives of styrene;
(2) about 15 to about 50% by weight of hydroxyalkyl (meth) acrylate, with the proviso that said hydroxyalkyl (meth)acrylate is not hydroxypropyl methacrylate; and
(3) about 0 to about 60% by weight of alkyl (meth)acrylate, wherein said alkyl (meth) acrylate is not component (b) (2), wherein said polymer (B) is formed by polymerizing the monomer units of (b) in said aqueous dispersion to thereby obtain an aqueous dispersion of a blend of polymers with a total solids content of up to about 60%.

2. The method of claim 1 wherein said sulfomonomer is sodiosulfoisophthalic acid.

3. The method of claim 1 wherein said dicarboxylic acid is isophthalic acid.

4. The method of claim 1 wherein said glycol is poly(ethylene glycol).

5. The method of claim 1 wherein said polyester (A) has repeat units from isophthalic acid, sodiosulfoisophthalic acid, diethylene glycol, and another glycol selected from the group consisting of ethylene glycol and 1,4-cyclohexandimethanol, and polymer (B) containing at least 20% by weight of repeat units from styrene or one or more derivatives of styrene, and at least 15% by weight of hydroxyalkyl (meth)acrylate, with the proviso that said hydroxyalkyl methacrylate is not hydroxypropyl methacrylate.

6. The method of claim 1 wherein said polymer (B) further comprises repeating units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

7. The method of claim 1 wherein said polymer (B) comprises repeating units from at least 20% by weight of one or more comonomers selected from the group consisting of styrene, methylmethacrylate, ethylhexylacrylate and butylacrylate.

* * * * *